Dec. 30, 1941.   M. R. DE FRANCE   2,268,280
BRAKE SHOE
Filed Nov. 6, 1937
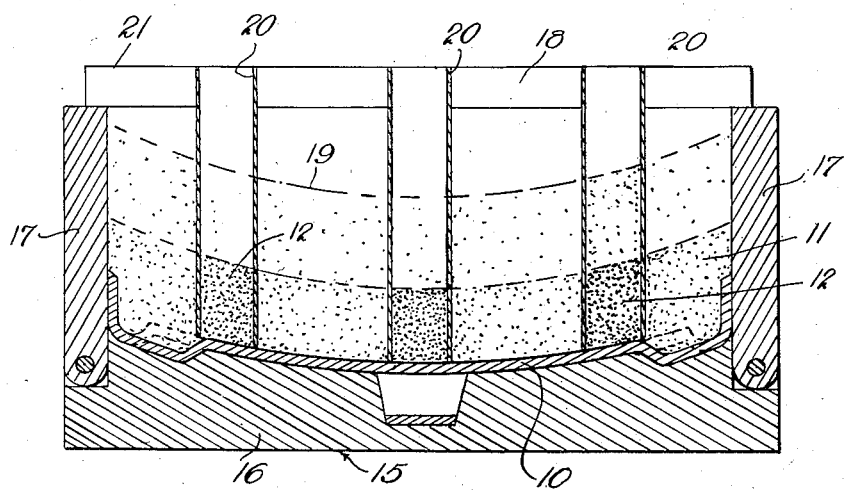
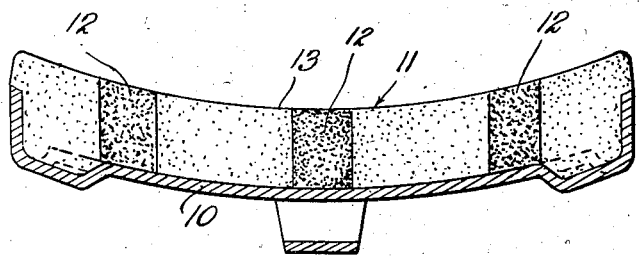
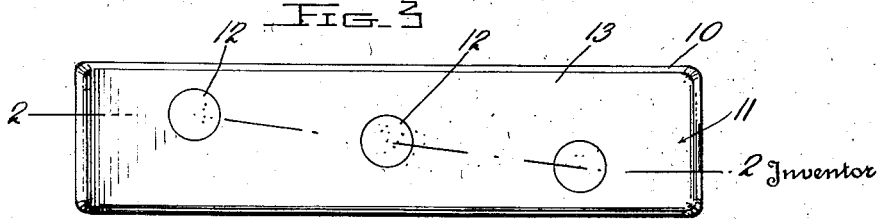

Patented Dec. 30, 1941

2,268,280

UNITED STATES PATENT OFFICE 2,268,280

BRAKE SHOE

Murrell R. De France, Pittsburgh, Pa.

Application November 6, 1937, Serial No. 173,239

10 Claims. (Cl. 106—36)

This invention relates to brake shoes and particularly to brake shoes of the non-metallic type, generally designated composition shoes.

Various types of composition shoes have heretofore been suggested and certain of them made use of for the purpose of applying braking forces to rotating machine parts, particularly where the braking forces which such shoes were called upon to apply were not great. Generally speaking, however, the composition brake shoe has not been adopted for use in cases where the operating conditions may be termed severe, i. e., where brake shoes of relatively small size must necessarily be used to frictionally retard members moving at relatively high speeds under all conditions of weather, frequent application, and where subjected to great vibration. In such instances the well-known cast metal brake shoe has been almost universally employed, being thought to be more reliable, and this in spite of the known superiority of the composition shoe over the cast metal shoe in various respects, including its lower cost.

Particularly upon railroads the use of the cast metal shoe is adhered to, no brake shoe of the composition type heretofore designed or constructed having been regarded as the equal of the cast metal shoe for railroad use, where the shoe may be called upon to function for long periods of time under adverse conditions and where durability and reliability in operation are primary requisites.

While the purpose of the present invention is to provide a brake shoe of the composition type which is of general usefulness throughout the mechanical arts, and a novel method of making the same, it is an especial object to provide a composition brake shoe of relatively low cost but which is well adapted for railroad, street car and other rolling stock use, and is in fact superior in operation to the well-known and almost universally used cast iron shoe.

In Patent No. 1,557,668, granted to me October 20, 1925, is disclosed a brake shoe of the composition type, and a method of making the same, it being therein suggested that the body or friction producing block of the brake shoe be fabricated of two different compositions, the friction producing characteristics of which vary, and that the brake block or shoe be also so made that the surface thereof which is presented to the moving member to be frictionally retarded include areas of both types of composition, the two areas being carefully proportioned so that the working surface of the shoe comprises in part an area of a substance which produces a high degree of friction and in part an area of a substance which produces substantially less friction, when the shoe is presented to the moving surface to be retarded, the relative areas of these substances being maintained constant throughout the life of the brake shoe, despite wearing away of the surface thereof, so that the retarding effect of the shoe will neither increase nor decrease during its useful life. The method thus disclosed is of the greatest usefulness in the manufacture of composition brake shoes, especially in the manufacture of composition brake shoes of the heavy duty type, as for instance those to be used as braking elements for railroad rolling stock. I have, however, further developed and perfected a composition to be used in the manufacture of brake shoes in accordance with the teachings of the aforementioned patent and have likewise improved the method of manufacture in certain ways, particularly in greatly increasing the pressures to which the composition material is subjected during the operation of forming the brake block or shoe, and in the grading in accordance with size of the various materials which are ingredients of the shoe, the careful grading of the materials according to size, and the substantial increase in pressure to which such materials are subjected in the formation of the block, resulting in a block of more homogeneous texture throughout than those heretofore made and having greater durability and utility under severe operating conditions. The precise nature of the compositions made use of, and the method employed in the formation of the block from the specified compositions will be described.

A brake block or shoe fabricated in accordance with the teachings of the invention has a further material advantage over those of composition type which have heretofore been made and used. The binding substance most commonly employed in the manufacture of composition brake shoes is linseed oil. While this material is a very effective binder it has been found to have one objectionable tendency, i. e. when present in a brake block in active service it causes the evolution of smoke and offensive odors from the block during the time that the block is being pressed against a moving surface. The brake block contemplated by the present invention preferably includes linseed oil as a binder, but the method of manufacture is such that the linseed oil does not generate a material amount of smoke, and no appreciable odor, when the block is in use. It is believed that this highly advantageous result is obtained by reason of the higher pressures employed in the manufacture of the block. The finished block may freely be made use of in brakes for use on subway cars and the like, whereas composition blocks of the prior art have been found unusable for such purposes.

In the accompanying drawing:

Figure 1 is a longitudinal section through portion of a mold device which is employed in the fabrication of a brake shoe;

Figure 2 is a longitudinal section through the completed shoe, taken on line 2—2 of Figure 3; and Figure 3 is a plan view of the working surface of the shoe.

The completed shoe will be seen to comprise a metallic shell or housing 10 which may be of any suitable shape and for which no novelty is claimed, it being the function of this shell to retain and support the composition brake block which is generally indicated at 11. The composition brake block is shown to comprise a plurality of contiguous sections extending from the concave braking surface to the concave face of the shell 10. Certain of these sections, indicated by the numeral 12, are of one type or kind of composition and the remainder of the block, which comprises one large section within which sections 12 are retained, is indicated by the numeral 13, fabricated of a different type or grade of such composition. Thus the sections 12 may be fabricated of a composition designed and intended to offer much greater frictional resistance to a rotating wheel or the like than does the material of which the main body 13 is fabricated.

As fully set forth in my prior patent referred to, the relative areas of the exposed surfaces of these sections, i. e., the relative areas of the effective working faces of the two different compositions which bear against the rotating member to be retarded, may be closely regulated during the fabrication of the brake shoe in order to produce the desired retarding effect for a given pressure of the shoe against the rotating object. This area relationship will remain constant throughout the life of the shoe, despite wearing away of its active surface, as will be apparent.

In Figure 1 of the drawing a mold device is shown in section, being generally indicated by the numeral 15. The base 16 of this mold device serves as a rest for the shell 10 of the brake shoe and foldable end portions 17, and suitable lateral or side members, one of which is indicated at 18, serve to confine the body of plastic composition which is placed in the mold, and the level of the upper surface of which is indicated at 19. Partition members are indicated at 20, which members may be fabricated of thin metal or other suitable material, are preferably tubular, and which are connected to the longitudinally extending member 21 so as to be readily insertable into the mold and readily removable. In the fabrication of a brake shoe, the composition is placed in the mold after the partition device has been positioned as shown in Figure 1, the necessary amount of friction producing composition being placed in each tubular pocket, and the remainder of the mold filled with the material from which the body 13 is to be formed. Subsequently the partition members 20 are removed, being lifted vertically upwardly, thus allowing the materials of the body 13 and plug like inserts 12 to come into contact. Following this, the entire mass of the material within the mold is subjected to heavy pressure so that the composition is compressed and rendered dense and is, as a matter of fact, reduced in volume around 50% by such compressive action so that the upper surface of the material, generally indicated at 19 in Figure 1, is lowered to the proximity of the upper edge of the brake shoe shell, as indicated in Figure 2.

As has previously been pointed out, the sections 12 of the completed brake shoe are different in composition from the body 13 and, in that form of shoe which is illustrated, the plugs or sections 12 are formed of material having substantially greater friction producing properties than has the body 13. The material of which sections 12 are formed includes silica sand, asbestos sand, asbestos cement, coke dust and a binder for these materials, prefably double boiled linseed oil.

The preferred composition made use of in the formation of the friction producing section 12 for railroad use comprises, by weight:

| | Per cent |
|---|---|
| Sharp, white silica sand | 23 |
| Asbestos sand | 11 |
| Asbestos cement | 33 |
| Coke dust | 22 |
| Double boiled linseed oil | 11 | although minor variations in the percentages set forth may be made without substantially lessening the ability of the material to function in the desired manner.

The silica sand should be of highest grade for best results, preferably of the kind used in the manufacture of glass, should pass through a 30 mesh screen and should remain, at least in large part, upon a 40 mesh screen. The asbestos sand is a granular substance obtained as screenings from the process for the production of fibrous asbestos, and is a known commercial product, containing but little asbestos in fibrous form. The coke dust used should be of such size that all of it will pass through a 40 mesh screen. Asbestos cement is a commercial product, containing asbestos dust, sand, fluff and fiber. This is screened through a 10 mesh screen to remove the fiber, as the fiber is detrimental to the homogeneity of the composition, only the dust, sand and fluff in the asbestos cement being used. The coke, asbestos sand, dust and fluff are placed in a mixing machine and thoroughly mixed before the oil is added. This is done not only to provide a uniform combination, but to further reduce the size of any of the ingredients, so that the entire batch or mix will pass through a 20 mesh screen. These materials, as thus mixed together are further mixed with linseed oil, to form the plastic material which is actually placed in the tubular partition member of the mold.

The frictional composition 12 for use on street cars and other lightweight rolling stock varies in proportion to the wheel load, brake pressure, speed and grades on which the cars are operated, by weight:

18% minimum 27% maximum silica sand
9% minimum 15% maximum asbestos sand
28% minimum 35% maximum asbestos cement
18% minimum 26% maximum coke dust 10% double boiled linseed oil These dry ingredients are thoroughly mixed, as is described in the friction composition for railroad use before the binding oil is added.

The material to be used in the remainder of the mold, to form the body 13 of the shoe, for railroad use, and which has comparatively little ability to frictionally grip a moving metal part, preferably comprises, by weight:

| | Per cent |
|---|---|
| Asbestos sand | 10 |
| Asbesto cement | 37 |
| Coke dust | 44 |
| Double boiled linseed oil | 9 | the asbestos sand and asbestos cement, being of the grade and size used in the composition first described. The coke dust used, however, is slightly larger in grain, 45% of it passing through a 20 mesh but not through a 40 mesh screen, and 55% passing through a 40 mesh screen.

The composition 13 for use on street cars and lighter rolling stock will vary for the same reasons given for the variations in the 12 or frictions areas, by weight:

8% minimum 16% maximum asbestos sand
32% minimum 42% maximum asbestos cement
39% minimum 49% maximum coke dust
10% maximum double boiled linseed oil The dry ingredients of composition 13 for both the railroad and street car shoe are thoroughly mixed, as is described in the compounding of the friction areas 12.

The composition last described, that of inferior friction producing quality, contains no silica sand, which sand is a dense, hard material, strongly resisting crushing and well suited for use as an abrasive and will develop little or no perceptible friction under A. A. R. braking specifications. While it is clear from an inspection of a completed brake block that the several ingredients have so entered into combination with each other that no one can function as it would alone, it may be surmised that the asbestos sand and the coarser coke dust carry the load imposed upon the block, i. e. transmit the compressive forces, these materials strongly resisting crushing and also being able to withstand high temperatures. The asbestos dust and fluff from the asbestos cement, together with the finer coke dust probably serve to fill the voids between the particles of asbestos sand and coarser coke dust. The shoe formed of these ingredients and the specified amount of linseed oil, and subjected to the heavy pressures set forth to obtain the desired density, wears by pulverization, becomes highly polished in use and imparts a high polish to the wheel with which it is associated, the contact between shoe and wheel being almost perfect. The friction producing areas will produce any desired amount of friction with less wear than that of a cast iron shoe, which wears by granulation.

The composition of superior friction producing characteristics contains approximately the same amount of asbestos sand as the composition of inferior friction producing characteristics, and approximately the same amount of asbestos cement. The amount of coke and coke dust, instead of being 44%, however, is reduced to 22% and 23% of silica sand is added, which silica sand is of a size passing through a 30 mesh screen. The amount of double boiled linseed oil employed as a binder is only slightly larger. Hence the composition of superior friction producing characteristics may be said to be generally similar to that of less friction producing capacity except in that a portion of the filling substance, i. e. the coke and coke dust are replaced by silica sand.

It will be appreciated that, while I have set forth precisely the exact percentages of two compositions in the foregoing examples, this has been done by way of suggestion and not by way of limitation. The exact percentages given may be varied, for instance the percentages of silica sand may be increased or decreased to increase or decrease the friction producing characteristics of the more strongly frictional material, and the coke and coke dust content of such composition be decreased or increased accordingly. The portion of asbestos cement in both compositions suggested may be varied slightly and likewise small variations in the content of the binder are without significance.

By actual test, however, I have ascertained that a brake shoe embodying the compositions above set forth exactly possesses superior braking qualities when made use of in the fabrication of brake shoes for use in connection with railroad rolling stock and I recommend that the percentages set forth be approximately followed in the fabrication of brake shoes intended for this use.

The sizing of the materials as above directed is of importance, as it is desirable that a brake shoe of uniform density throughout be produced since, if the recommendations as set forth are followed, there will be a minimum of voids in the material. It is important that the brake shoe composition be subjected, in the final formation of the brake block, to very heavy pressure between the pressure heads of a hydraulic or other press having the capacity to develop such pressures. Thus in the fabrication of the blocks from the specified composition, the composition is subjected to a minimum pressure of 5,500 pounds per square inch. This pressure may advantageously be increased up to 7,700 pounds per square inch, or even higher. At around a pressure of 5,500 pounds per square inch the greatest possible density of the resulting block is obtained but it is found that increased pressures result in more satisfactory distribution of the binder and improved physical characteristics of the resulting block, which tends to make the block more durable in use. When submitted to a pressure of about 5,500 pounds per square inch the resulting block will have a density of just about one ounce per cubic inch. Increase in the pressure to 7,700 pounds per square inch will not increase the density more than a very small fraction of an ounce per cubic inch. The homogeneity of the material is improved materially, however, and serviceability of the block or shoe promoted. A shoe or brake block constructed in the manner above described is light in weight but extremely durable and has numerous advantages over cast metal blocks and other known types of composition blocks.

Having thus described the invention, what is claimed as new and desired to be secured by Letters Patent is:

1. A composition for use in brake blocks comprising, by weight, 23% silica sand, 11% asbestos sand, 33% asbestos cement, 22% coke dust and 11% linseed oil.

2. The composition set forth in claim 1 in which all the ingredients will pass through a 20 mesh screen.

3. The composition set forth in claim 1 in which the coke dust is sufficiently small to pass through a 40 mesh screen.

4. The composition set forth in claim 1 in which the silica sand is sufficiently small to pass through a 30 mesh screen, the asbestos cement through a 20 mesh screen, and the coke dust through a 40 mesh screen.

5. A composition for use in brake blocks comprising, by weight, 10% asbestos sand, 37% asbestos cement, 44% coke dust, and 9% linseed oil.

6. The composition set forth in claim 5 in which all the ingredients will pass through a 20 mesh screen.

7. The composition set forth in claim 5 in which slightly more than half of the coke dust will pass through a 40 mesh screen and slightly less than half through a 20 mesh, but not through a 40 mesh screen.

8. The composition set forth in claim 5 in which all of the asbestos cement will pass through a 20 mesh screen and more than 10% thereof through a 100 mesh screen, and the coke dust through a 20 mesh screen.

9. A brake block composition comprising, by weight, 9% to 15% asbestos sand, 28% to 35% asbestos cement, 18% to 26% coke dust, and a binder of double boiled linseed oil not exceeding 10%.

10. A brake block composition comprising, by weight, 8% to 16% asbestos sand, 32% to 42% asbestos cement, 39% to 49% coke dust and a binder of double boiled linseed oil not exceeding 10%.

MURRELL R. DE FRANCE.